T. BROWN.
MOWER.
APPLICATION FILED SEPT. 22, 1914. RENEWED JAN. 19, 1918.
1,270,488.
Patented June 25, 1918.
2 SHEETS—SHEET 2.
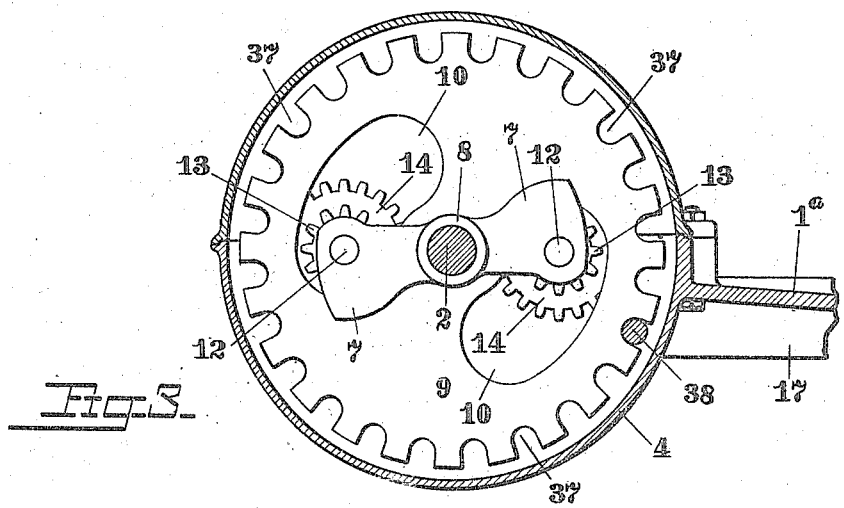
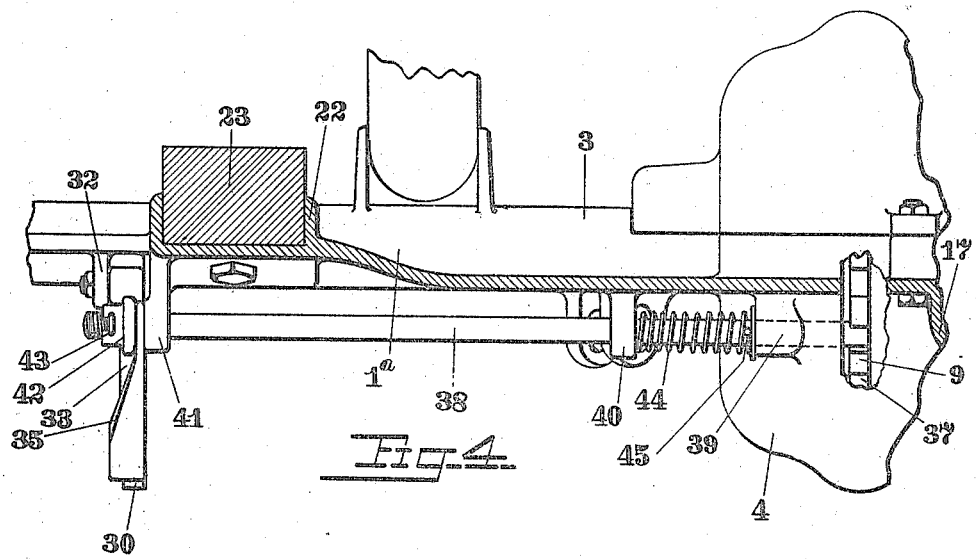

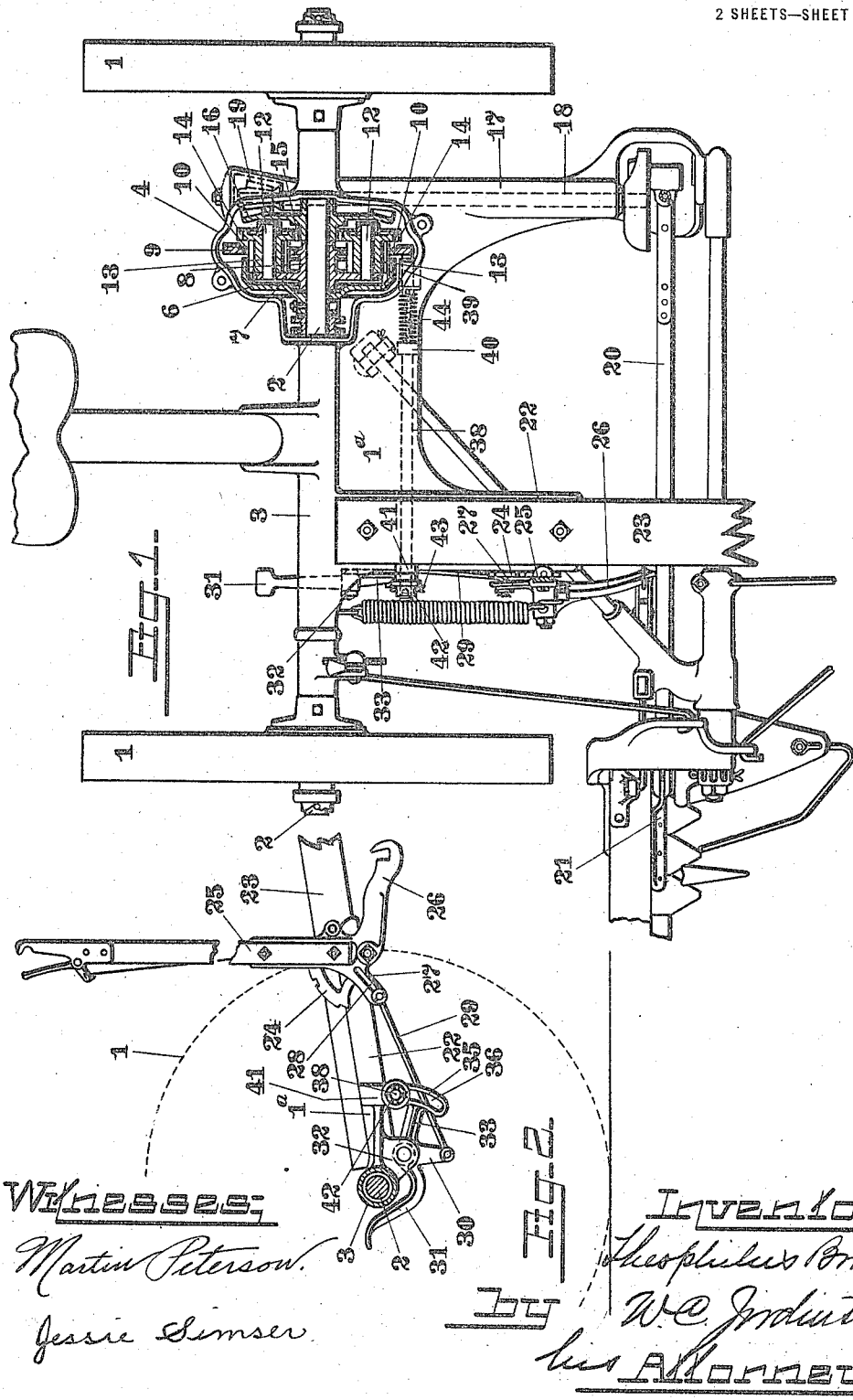

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

MOWER.

1,270,488.   Specification of Letters Patent.   Patented June 25, 1918.

Application filed September 22, 1914, Serial No. 862,904. Renewed January 19, 1918. Serial No. 212,839.

*To all whom it may concern:*

Be it known that I, THEOPHILUS BROWN, a citizen of the United States, residing at Moline, in the county of Rock Island and State of Illinois, have invented certain new and useful Improvements in Mowers, of which the following is a specification, reference being had therein to the accompanying drawing.

My invention relates to mowers, and particularly to means employed to throw out of action the gearing conveying power to the cutting mechanism.

The object of my invention is to provide a device for the purpose stated that is operable by foot power or automatically when the cutter bar is raised.

Referring to the drawings in which similar numerals indicate identical parts—

Figure 1 is a plan view of a mower embodying my invention the top of the gear case being removed and the gearing shown in section.

Fig. 2 is a detail section showing the hand and foot levers and connected parts.

Fig. 3 is an enlarged detail in section, of the gear casing showing part of the gearing and the member upon which it is supported, and Fig. 4 is an enlarged detail illustrating the detent and its application.

My invention is applicable more particularly to the type of mower gearing shown and described in my pending application filed December 11, 1913, Serial No. 806,094 to which reference is made.

Wheels 1 are mounted upon an axle 2 in a well known manner so that the traction power of the wheels is only utilized to drive the cutting mechanism when the machine is advancing.

The frame 1ª comprises a tubular portion 3 having a box or casing 4 in which the gearing is housed and which is provided with a removable cover as usual. A driving internal gear 6 is secured to the axle 2 and revolves continuously therewith. Revoluble freely on the axle 2 is a member 7, having an extended hub 8, preferably integral with which is a circular member 9 having oppositely disposed orifices 10. Projecting through the orifices 10 are double gears mounted on stub shafts 12 secured on the member 7. The pinions 13 of the double gears mesh with the driving gear 6; spur gears 14 forming part of the double gear mesh with a pinion 15 preferably integral with the hub of a bevel gear 16 adapted to revolve freely on the shaft 2.

Journaled in a housing 17, forming part of the frame 1ª, is a crank shaft 18 having a bevel pinion 19 secured upon its rearward end and engaging with the bevel gear 16. A pitman 20 is connected to the crank end of the shaft 18 and to a cutter bar 21 of a common type; power to operate the cutter bar 21 being derived from the traction of the wheels 1 and through the internal gear 6, secured on the axle 2; the internal gear 6 actuating the pinions 13 and the spur gears 14 of the double gear, and as the spur gears 14 engage with the pinion 15 on the bevel gear 16, the latter is operated to drive the cutting mechanism through the bevel pinion 19 and the crank shaft 18.

To an extended part 22 of the frame 1ª is secured a draft pole 23. Forwardly on the grassward side of the extended part 22 is firmly secured a quadrant 24 having a hand operable lever 25 pivotally mounted on the lower portion thereof and having an arm 26 connected with the usual type of bell crank by which the cutter bar can be raised or lowered by operation of the lever. Extending rearwardly from the lever 25 is an arm 27 having a slot 28. Movably secured in the slot 28 is the forward end of a link 29, the latter extends rearwardly to a pivotal engagement with a downwardly projecting arm 30 forming part of a foot lever 31 extending rearwardly beneath the tubular portion 3 of the frame 1ª and pivotally mounted in a bearing 32 on the frame 1ª. Preferably integral with the foot lever 31 and extended forwardly is an arm 33 having its outer end projected vertically both sides of the central line of the main portion, the grassward face of the outer end being a cam 35 in which is a slot 36 concentric with the pivot of the foot lever 31.

In the periphery of the circular member 9 are notches 37, equidistant from each other, with any one of which an end of a rod 38 is adapted to engage. The rod 38 is slidably mounted in bearings 39, 40 and 41, bearings 39 and 40 being on the underside of the frame 1ª; bearing 41 extends from below the frame 1ª to the upper edge of the part 22 of the frame 1ª to form a bearing surface for the straight side of the cam 35. The rod 38 projects through the slot 36 and has a flanged member 42 secured on its end preferably by a cotter 43. A coil spring 44 encircles the rod 38 between the bearings 39 and 40 exerting its pressure upon the bearing 40 and a pin 45 secured on the rod 38.

In operating my device, rocking the lever 25 rearwardly to raise the cutter bar 21, the foot lever 31 is simultaneously actuated through the link 29, so that the cam 35 rises between the bearing 41 and the flanged member 42 moving the rod 38 grassward and disengaging it from a notch 37 in the periphery of the circular member 9 and contracting the coil spring 44. As the rod 38 holds the circular member 9 firmly against revolution it follows that the traction power of the wheels 1 will be transmitted through the internal gear 6 and the pinions 13 and spur gears 14 to the pinion 15 on the bevel gear 16, the latter meshing with the bevel pinion 19 the crank shaft 18 is revolved to actuate the cutting mechanism; when, however, the rod 38 is disengaged from a notch in the circular member 9 the latter and the member 7, having a common hub 8, are free to revolve on the axle 2, so that no power is transmitted through the internal gear 6, which is secured on the shaft 2, the pinions 13 and the spur gears 14 revolving idly and the bevel gear 16 and bevel pinion 19 being inert, consequently the cutting mechanism is out of operation.

It is frequently the case that it is desirable to render the cutting mechanism inoperative without lifting the cutter bar, in that event the operator by downward pressure of his foot upon the foot lever 31 will rock the latter raising the cam 35 to operate between the bearing 41 and the flanged member 42 and disengaging the end of the rod 38 from a notch 37 in the circular member 9 and throwing the gearing out of operation as above described; this movement of the foot lever 31 by the foot of the operator has no influence upon the hand lever 25 with which it is connected by the link 29, the forward end of the link 29 being free to slide in the slot 28 in the arm 27.

It is apparent that by operating the hand lever 25 to lower the cutter bar the cam 35 is moved downward and the end of the rod 38, acted upon by pressure of the coil spring 44, will engage with one of the notches 37 in the periphery of the circular member 9 holding the latter stationary so that the gearing will be operative to actuate the cutting mechanism; moving the cam 35 downwardly by an upward movement of the foot 31 have a similar effect on the rod 38 to cause it to engage with one of the notches 37 in the circular member 9.

My device is simple and effective in operation, and quickly responsive to the action of either the hand or foot lever.

What I claim is—

1. In a mower, the combination of a frame, an axle journaled thereon, ground wheels operating substantially as described to rotate the axle, a cutter, a train of power transmitting gearing mounted on the axle in constant operative relation and permanently connected with the cutter to operate the latter by power from the ground wheels, and means to raise the cutter and to automatically check the transmission of power thereto.

2. In a mower, the combination of a frame, an axle journaled thereon, ground wheels operating substantially as described to rotate the axle, a cutter, a train of power transmitting gearing mounted on the axle in constant operative relation and permanently connected with the cutter to operate the latter by power from the ground wheels, and means to raise the cutter and to automatically and simultaneously check the transmission of power to the cutter when the latter is raised.

3. In a mower, the combination of a frame, an axle journaled thereon, ground wheels operating substantially as described to rotate the axle, a cutter, a train of power transmitting gearing mounted on the axle in constant operative relation and permanently connected with the cutter to operate the latter by power from the ground wheels, a rotatable member loosely mounted on the axle and carrying a portion of the gearing, a lever connected with the cutter and operable to raise the latter at will, and means actuated by the lever to check the transmission of power to the cutter when the latter is raised.

4. In a mower, the combination of a frame, an axle journaled thereon, ground wheels operating substantially as described to rotate the axle, a cutter, a train of power transmitting gearing mounted on the axle in constant operative relation and permanently connected with the cutter to operate the latter by power from the ground wheels, a rotatable member loosely mounted on the axle and carrying a portion of the gearing, means to hold said member immovable during actuation of the cutter, means to raise the cutter and to automatically release said member to check the transmission of power to the cutter when the latter is raised.

5. In a mower, the combination of a frame, an axle journaled thereon, ground wheels operating substantially as described to rotate the axle, a cutter, a train of power transmitting gearing mounted on the axle in constant operative relation and permanently connected with the cutter to operate the latter by power from the ground wheels, a rotatable member mounted on the axle and carrying a portion of the gearing, a detent adapted to hold said member immovable during actuation of the cutter, a lever operable to raise the cutter at will and to automatically and simultaneously move the detent to release said member and check the transmission of power to the cutter when the latter is raised.

6. In a mower, the combination of a frame, an axle journaled thereon, ground wheels operating substantially as described to rotate the axle, a cutter, a train of power transmitting gearing supported on the axle and permanently connected with the cutter to operate the latter by power from the ground wheels, said train comprising a primary gear fixed to the axle, a secondary gear loosely mounted on the axle and permanently connected with the cutter, a member loosely mounted on the axle a detent to hold said member immovable during operation of the cutter, intermediate gearing supported on said member and in constant mesh with the primary and secondary gears, and a lever operable to raise the cutter and to simultaneously release said member and check the transmission of power to the cutter.

7. In a mower, the combination of a frame, an axle journaled thereon, ground wheels operating substantially as described to rotate the axle, a cutter, a train of power transmitting gearing supported on the axle and permanently connected with the cutter to operate the latter by power from the ground wheels, said train comprising a primary gear fixed to the axle, a secondary gear loosely mounted on the axle and permanently connected with the cutter, intermediate gearing in constant mesh with the primary and secondary gears and supported on a member loosely mounted on the axle, a detent to hold said member immovable during operation of the cutter, a lever to raise the cutter and simultaneously release said member to check transmission of power to the cutter.

8. In a mower the combination of a frame, an axle journaled thereon, ground wheels operating substantially as described to rotate the axle, a cutter, a train of power transmitting gearing supported on the axle and permanently connected with the cutter to operate the latter by power from the ground wheels, said train comprising a primary gear fixed to the axle a secondary gear loosely mounted on the axle and permanently connected with the cutter, intermediate gearing in constant mesh with the primary and secondary gears and supported on a circular member loosely mounted on the axle, notches in the periphery of said member, a lever operable to raise the cutter, and a detent engaging with one of said notches to hold the member immovable when the cutter is operated, said detent being automatically withdrawn from said notch by operation of the lever when the cutter is raised.

9. In a mower, the combination of a frame, an axle journaled thereon, ground wheels operating substantially as described to rotate the axle, a cutter, a train of power transmitting gearing mounted on the axle in constant operative relation and permanently connected with the cutter to operate the latter by power from the ground wheels, means to raise the cutter and to simultaneously check the transmission of power thereto, and means to check the transmission of power to the cutter while the latter is down.

10. In a mower, the combination of a frame, an axle journaled thereon, ground wheels operating substantially as described to rotate the axle, a cutter, a train of power transmitting gearing mounted on the axle in constant operative relation and permanently connected with the cutter to operate the latter by power from the ground wheels, a hand lever operable to raise the cutter and to simultaneously check the transmission of power thereto, and a foot lever operable to check the transmission of power to the cutter while the latter is down.

11. In a mower, the combination of a frame, an axle journaled thereon, ground wheels operating substantially as described to rotate the axle, a cutter, a train of power transmitting gearing mounted on the axle in constant operative relation and permanently connected with the cutter to operate the latter by power from the ground wheels, said train comprising a primary gear fixed to the axle, a secondary gear loosely mounted on the axle and permanently connected with the cutter, intermediate gearing in constant mesh with the primary and secondary gears and supported on a member loosely mounted on the axle, a detent to hold said member immovable during operation of the cutter, a hand lever to raise the cutter and to simultaneously release said member to check transmission of power to the cutter, and a foot lever operable to release said member and check the transmission of power to the cutter while the latter is down.

In testimony whereof I affix my signature, in presence of two witnesses.

THEOPHILUS BROWN.

Witnesses:
JESSIE SIMSER,
JOSEPH DAIN.

Copies of this patent may be obtained for five cents each, by addressing the "Commissioner of Patents, Washington, D. C."